UNITED STATES PATENT OFFICE

2,270,062

METHOD FOR MANUFACTURING POUR POINT DEPRESSANTS FOR WAXY LUBRICATING OILS

Eugene Lieber, Linden, N. J., assignor to Standard Oil Development Company, a corporation of Delaware No Drawing. Application December 14, 1938, Serial No. 245,673

12 Claims. (Cl. 252—57.)

The present invention relates to the art of lubricants and more specifically to improved methods for manufacturing pour point depressants for waxy lubricating oils and to these new products. The invention will be understood from the following description.

Wax modifying agents have been made by the condensation of chlorinated wax with cyclic compounds, particularly hydrocarbons such as naphthalene. The product obtained is a viscous to solid polymer containing long side chains attached to the cyclic nucleus. It has been found that improved products can be produced without the use of wax and that such materials may be produced more readily and cheaply where wax is not available.

The products of the present invention are made by condensation of cyclic compounds containing relatively short aliphatic radicals, such as propyl, butyl, amyl and the like, or short chain acyl radicals such as propionyl, butyryl, capryl, with dihalides of short chain aliphatic hydrocarbons having less than 10 carbon atoms and especially containing from 1 to 5 carbon atoms. Examples of these latter materials are dichlor methane, dichlor ethylene, dibrom propylene and the like.

The new wax-modifying agents are made by condensation of various non-waxy products which will be defined more fully below, with dihalo containing products. Of the non-waxy compounds cyclic hydrocarbons containing short hydrocarbon chains are the most important such as alkylated benzol, naphthalene, anthracene, their hydrogenated compounds and the like, in which the alkyl group contains less than 5 carbon atoms. The hydrocarbon chains need not be directly attached to the ring power since excellent results are obtained with arylalkyl ketones and ethers such as

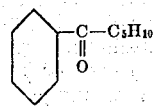

and

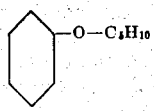

or the corresponding compounds of naphthalene or other aromatics or similar butyl, propyl ethyl or methyl ketones or ethers. Low boiling hydrocarbon fractions such as naphtha, kerosene and gas oil which contain alkylated aromatic fractions may also be employed.

As examples of the dihalo compounds there may be included dihalo aliphatics having less than 10 carbons atoms, and preferably less than 5 carbon atoms such as dichlor methane, dichlor ethylene, dibrom propylene, and the like. Halides of dibasic organic acids may likewise be used such as oxalyl chloride, adipyl chloride, succinyl bromide, sebacyl chloride and the like.

In the preparation of these present improved depressors, the alkylated cyclic compounds, for example, monopropyl, monobutyl, or monoamyl naphthalene, or equivalent cyclic compounds such as ketones and ethers are first prepared, if not available as such, by any known method, for example, a lower alkyl chloride or other halide such as butyl, propyl or amyl chloride condensed on any unsubstituted aromatic or other cyclic nuclear compound in the presence of aluminum chloride or equivalent catalyst such as boron fluoride, zinc chloride and ethers or ketones, by similar known methods. If desired, olefins such as propylene, butylene and amylene may be used in place of the alkyl chlorides and in such case, the condensation is carried out in the same way and with the same catalysts, for example aluminum chloride, or it may be brought about with acid catalysts such as sulfuric acid, phosphoric acid and other known equivalents. The formation of these alkylated products is not invention per se and the particular point to be emphasized is that the depressants are produced from the alkylated cyclic and especially aromatic compounds which are used directly as one of the reactants in the subsequent condensation process which gives rise to the pour inhibiting compounds. It is not necessary to isolate the lower alkyl aromatic and the subsequent condensation with the dihalide can be carried out in the crude reaction mixture.

The condensation between the alkylated aromatic or other cyclic compounds and the short chain dihalo compounds is then accomplished. These ingredients are employed in approximately equimolar amounts, and a substantially inert solvent such as naphtha, kerosene, or some saturated tri or higher substituted halo paraffin, for example, trichlor ethane, tetrachlor ethane or the like may be used. While the reactants are being stirred together, a catalyst such as aluminum chloride is added in an amount from say .05 to .5 mol per mole of polyhalo compound and the temperature is maintained above about 175° F. It is conveniently maintained at the boiling point of the polyhalo compound employed in the reaction or at the boiling point of the solvent which is used, whichever of these is the lower. The reaction takes place in an hour or more. The exact conditions of time and temperature, catalyst and catalyst quantity can be adjusted among themselves for the optimum results, and it will be understood that they are interrelated so that a change in one variable may be compensated by some change in another. Ordinarily the temperatures range from about 175° F. to 300° F., and a time of 1 to 5 hours is preferable but too long reaction time will produce oil insoluble products.

After the condensation, the depressant is recovered preferably after hydrolysis and removal of the catalyst. This is accomplished by addition of relatively large amounts of a solvent such as naphtha or kerosene to dissolve the depressant and the addition thereto of water, alcohol or a mixture of alcohol and water which hydrolyzes the catalyst. Aqueous and oily layers are then allowed to separate and the oily layer is drawn off and distilled up to a temperature of about 600° F., so as to remove the solvent and lower boiling products and to concentrate the wax modifier which is then collected as a residue. The lower boiling fractions may be recondensed so as to increase the yields if desired.

The wax modifier is used chiefly as an agent for depressing the pour point of waxy lubricating oils and for such purposes it is employed in a quantity of from about ½ to 5%. Different oils require different amounts as in the case with other depressants, but the range above given will generally be satisfactory. The product may also be used as a dewaxing aid in processes for removing wax from oil by means of a light solvent such as naphtha or low boiling alcohols, ketones or mixtures thereof with naphtha either by filtration, sedimentation or centrifugation and in any process and composition in which it is desired to modify the crystal structure of waxes.

Attention should be called to a prior patent, U. S. 2,072,107, of March 2, 1937, which bears some similarity to the present case, but the products in the two cases are quite different. The product of the prior patent is made by condensation of unsubstituted aromatic hydrocarbons, preferably benzol, with di-halogenated short chain aliphatics and after the said condensation the product is then alkylated with alkyl chlorides. The present process differs from the one of the patented process in several respects, but the principal difference is that in the present process the alkylation precedes the condensation of the cyclic product with the short chain halo aliphatics whereas in the process of the patent the condensation takes place first and the condensation product is then alkylated. No reasons are offered for the differences in the products but the results show that the materials are quite different. First, the products of the patent are not pour inhibiting agents in the main and such products as do possess any pour inhibiting properties are very weak in that respect. They are, on the other hand, powerful thickening agents causing a considerable viscosity increase at 210° F., and the presence of small amounts greatly increases viscosity index of the oils to which they are added even of natural oils of the highest index obtainable. On the contrary, the present product is essentially a wax modifier or pour inhibitor and thickens lubricating oils to a much lesser extent than the previous products. Furthermore this product is not characterized by power to increase viscosity index to any substantial extent. Naturally, if the material is added to oils of very low viscosity index, some improvement may be obtained, but when added to high grade natural lubricating oils little or no increase in viscosity index is obtained and, on the contrary, with the preferred products a decrease in viscosity index is ordinarily noted. Thus while the products seem to be related, the differences are marked and are apparently due to the change in the process by which they are made.

Example I

To 100 grams of mono-amyl naphthalene are added 110 grams of ethylene dichloride and to this mixture 11 grams of aluminum chloride are added. The mixture is heated to a refluxing temperature of 183° F. for about two hours, and thereafter 500 cc. of kerosene are added. The mixture is cooled and washed with an alcohol-water mixture which effects the hydrolysis of the catalyst. The mixture is allowed to settle into two layers, the upper kerosene layer and the lower aqueous layer containing the products of the catalyst hydrolysis. The kerosene layer is withdrawn and distilled to about 600° F., and 92 grams of a dark viscous green oily residue are recovered. When 1% of this residue is added to a wax containing oil having an original pour point of 30° F., it is found to reduce the pour point to 0° F., while 5% of the residue reduces the pour point to —5° F.

Example II

The procedure of Example I was repeated in two instances using 22 and 32 grams of aluminum chloride and yields of 115 and 103 grams respectively of the distillation residue were recovered. The products were more potent than those produced in Example I. 1% of the product made using 22 grams of the catalyst depresses the pour point of the test oil to —15° F., while 5% reduces it to —20° F. 5% of the second product obtained with the larger amount of catalyst reduced the pour point to —30° F. These products gave the oil an attractive green fluorescence and deep through red color characteristic of Pennsylvania oils, even when quantities as low as .2% were used.

Example III

The procedure of Example I was again repeated but a reaction time of five hours was provided instead of the two hours of Example I. 1% of the product in the waxy oil showed a pour depression to —25° F., instead of to 0° F. as shown in Example I.

Example IV

A mixture of 200 grams of diamyl-benzene, 120 grams of ethylene dichloride and 12 grams of AlCl$_3$ were refluxed under a return condenser for 4 hours. At the end of this time, the reaction mixture was cooled, diluted with 500 cc. of kerosene and neutralized with a mixture of water and alcohol. After settling, the kerosene extract was washed and then distilled with fire and steam to 600° F. to remove low boiling products. A bottoms yield of 43 grams of a viscous dark red resinous mass was obtained.

When 1% of the condensation product was blended in a waxy-oil, the pour point of which was +30° F., the pour point was found to be —10° F. When 2% of the condensation product was added to the same waxy-oil, a pour point of —25° F. was obtained.

Example V

A mixture of 200 grams of diamyl-naphthalene, 100 grams of ethylene dichloride and 10 grams of AlCl$_3$ were refluxed under a return condenser for 2 hours. At the end of this time the reaction product was cooled, diluted, neutralized and recovered as described in Example IV. 45 grams of a viscous dark green oil was obtained as the product.

When 1% of this condensation product was added to a waxy-oil, the pour point of which was +30° F., the pour point was found to be −5° F.

It will be observed from Examples IV and V that the yields of these condensation products are generally lower than when starting with mono-amylated aromatic hydrocarbons, e. g. mono-amyl benzene and mono-amyl naphthalene.

*Example VI*

A product was made by condensation of 200 grams of benzol with 250 grams of ethylene dichloride, using 20 grams of aluminum chloride at a temperature of 180° C., for a time of 1 hour. 153 grams of a thick, viscous condensation product were recovered and this was alkylated with about an equal weight of amyl chloride, using 200 parts of carbon bisulfide as a solvent and 5 grams of aluminum chloride. The alkylation took place at 20° C. The alkylation time was about 3 hours and the product was recovered from the catalyst after hydrolysis by distilling off the lower portion of the solvent up to a temperature of about 600° F., so as to recover the residue.

This product was designated as sample I. Two other samples II, III and IV were made in exactly the same manner except that mono-amyl benzene, mono-amyl naphthalene and di-amyl naphthalene were used in place of benzol and the subsequent alkylation step was omitted.

When 1% of sample I was added to a test oil which had an original pour point of 30° F., it was found to remain at 30° F. When 5% was added, the pour point was reduced to 25° F. Viscosity was raised from 46.4 to 55 seconds Saybolt at 210° F., and the viscosity index of the oil was raised from 100 to 125. When sample II was added to the same oil in proportion of 5%, a pour reduction was obtained to −5° F. The viscosity index was raised from 100 to 104. When 5% of sample III was added to the oil, a pour point of better than −30° F. was obtained and the viscosity index was reduced from 100 to 92. When 5% of sample IV was added to the oil, a pour point of −10° F. was obtained and the viscosity index remained constant at 100.

From the above data it will be seen that sample I, made by alkylating the condensation product, had very little pour depressing strength but, on the other hand, was a powerful agent for increasing the viscosity index. However, when the order of the steps was reversed, i. e. the alkylation preceding the condensation reaction, strong pour inhibitors were produced but with little or no viscosity index increasing properties.

*Example VII*

A mixture of 200 grams of Columbian gas oil, 200 grams of ethylene dichloride and 15 grams of AlCl₃ were refluxed under a return condenser for 3 hours. At the end of this time the reaction mixture was cooled, diluted with 500 cc. of kerosene and neutralized with a mixture of water and alcohol. After settling the kerosene extract was distilled with fire and steam to 600° F. to remove low boiling products. A bottoms residue of 53 grams of a dark green resinous material was obtained as product.

When 1% of this condensation product was added to a waxy-oil, the pour point of which was +30° F., the pour point was found to be −10° F. When 5% of this condensation product was added to the same waxy-oil a pour point of −25° F. was obtained.

*Example VIII*

A mixture of 200 grams of kerosene (aniline point, 35° C.), 200 grams of ethylene dichloride and 15 grams of AlCl₃ were refluxed under a return condenser for 10 minutes. The condensation reaction was extremely vigorous and if allowed to continue much beyond 10 minutes the reaction mixture turns to an intractable rubbery mass. After 10 minutes the reaction mixture was cooled, diluted with a further quantity of kerosene (500 cc.) and neutralized with a mixture of alcohol and water. After settling, the kerosene extract was distilled with fire and steam to 600° F. to remove low-boiling products. A bottoms residue of 97 grams of a light reddish-green viscous oil was obtained as product.

When 1% of the condensation product was added to a waxy-oil the pour point of which was +30° F., the pour point was found to be 0° F. When 2% of the condensation product was added to the same waxy-oil a pour point of −15° F. was obtained.

*Example IX*

The procedure of Example VIII was repeated with the following proportion of reagents:

|  | Grams |
|---|---|
| Kerosene | 200 |
| Ethylene dichloride | 200 |
| AlCl₃ | 5 |

Under the above conditions it was found possible to reflux the reaction mixture for 45 minutes. At the end of this time the reaction mixture was cooled, diluted with a further quantity of kerosene and neutralized and recovered as described in Example VIII. A yield of 51 grams of a deep red very viscous oil was obtained as product.

When 2% of this condensation product was added to a waxy-oil the pour point of which was +30° F., the pour point was found to be −20° F.

*Example X*

A mixture of 200 grams of kerosene (as in Examples VIII and IX), 200 grams of ethylene dichloride and 15 grams of AlCl₃ were allowed to stand at room temperature, with occasional agitation, for 5 days. It was then neutralized with a mixture of alcohol and water and extracted with a further quantity of kerosene. After settling, the kerosene extract was distilled with fire and steam to 600° F. to remove low-boiling products. A bottoms residue of 64 grams of an extremely viscous red oil was obtained as product.

When 2% of the condensation product was added to a waxy-oil the pour point of which was +30° F., the pour point was found to be −15° F.

*Example XI*

A mixture of 140 grams of naphthalene, 118 grams of tertiary-amyl chloride and 110 grams of ethylene dichloride were placed in a 1-liter round bottom flask, fitted with a CaCl₂ filled drying tube, 22 grams of AlCl₃ was now slowly added to the reaction mixture over 90 minutes, with suitable agitation and maintaining the reaction mixture at room temperature. After the addition of the AlCl₃ the reaction mixture was allowed to stand for 12 hours at room temperature with occasional shaking. The CaCl₂ tube was now removed and the reaction vessel placed under a return condenser and the mixture refluxed for 75 minutes. After cooling, the reaction mixture was diluted with 500 cc. of kerosene and neutralized with a mixture of water and alcohol. After settling, the kerosene extract was distilled with fire and steam to 600° F. in order to remove low-boiling products. A bottoms residue of a deep-red resinous material was obtained. The yield was 80 grams.

When 2% of this condensation product was blended in a waxy-oil the pour point of which was +30° F., the pour point was found to be −15° F.

Example XII

The procedure of Example XI was followed exactly using the following reagents in the proportions indicated:

| | Grams |
|---|---|
| Naphthalene | 140 |
| Normal-amyl chloride | 118 |
| Ethylene dichloride | 110 |
| AlCl₃ | 22 |

A yield of 167 grams of a deep-red very viscous oil was obtained as product.

When 2% of this condensation product was blended in a waxy-oil, the pour point of which was +30° F., the pour point was found to be 0° F.

Example XIII

The procedure of Example XI was followed exactly using the following reagents in the proportions indicated:

| | Grams |
|---|---|
| Naphthalene | 140 |
| Tertiary-amyl chloride | 67 |
| Normal-amyl chloride | 67 |
| Ethylene dichloride | 110 |
| AlCl₃ | 22 |

A yield of 146 grams of a deep-red, very viscous oil was obtained as product.

When 2% of the condensation product was added to a waxy-oil, the pour point of which was +30° F., the pour point was found to be −10° F.

Example XIV

The procedure of Example XI was followed exactly using the following reagents in the proportions indicated:

| | | |
|---|---|---|
| Benzene | cc | 82 |
| Ethylene dichloride | cc | 95 |
| Tertiary-amyl chloride | cc | 111 |
| Normal-amyl chloride | cc | 111 |
| AlCl₃ | grams | 15 |

A yield of 70 grams of a dark green viscous oil was obtained as product.

When 2% of the condensation product was added to a waxy-oil, the pour point of which was +30° F., the pour point was found to be 0° F.

Example XV

The procedure of Example XI was followed exactly using the following reagents in the proportions indicated:

| | | |
|---|---|---|
| Benzene | cc | 82 |
| Ethylene dichloride | cc | 134 |
| Tertiary-amyl chloride | cc | 82 |
| Normal-amyl chloride | cc | 82 |
| AlCl₃ | grams | 17 |

A yield of 47 grams of a dark green resinous substance was obtained as product.

When 2% of the condensation product was added to a waxy-oil, the pour point of which was +30° F., the pour point was found to be −15° F.

Example XVI 20 grams of sebacic acid was converted to sebacyl chloride by treating with 10 grams of PCl₃ on the water bath. The resulting sebacyl chloride was then decanted from the phosphorous acid into a mixture of 100 grams of mono-amyl naphthalene and 150 cc. of tetrachlorethane used as solvent contained in a suitable reaction vessel. 26 grams of AlCl₃ were then slowly added with suitable agitation over a period of 30 minutes. After the addition of the AlCl₃, the reaction mixture was heated to 225° F. and maintained thereat for 60 minutes. After cooling, the reaction mixture was diluted with 500 cc. of kerosene and neutralized with a mixture of water and alcohol. After settling, the kerosene extract was distilled with fire and steam to 600° F. in order to remove low-boiling products. A bottoms residue comprising 79 grams of a deep green, moderately viscous oil was obtained as product.

When 2% of this condensation product was added to a waxy-oil, the pour point of which was +30° F., the pour point was found to be −5° F.

Example XVII

The procedure of Example XVI was followed exactly using the following reagents in the proportions indicated:

| | | |
|---|---|---|
| Mono-amyl benzene | grams | 200 |
| Sebacic acid | do | 20 |
| PCl₃ | do | 10 |
| Tetrachlorethane-solvent | cc | 150 |
| AlCl₃ | grams | 26 |

A yield of 38 grams of a green, moderately viscous oil was obtained as product.

When 1% of the condensation product was added to a waxy-oil the pour point of which was +30° F., a pour point of +5° F. was found. When 2% of the same condensation product was added to the same waxy-oil a pour point of −20° F. was obtained.

Example XVIII

The procedure of Example XVII was followed exactly using the following reagents in the proportions indicated:

| | | |
|---|---|---|
| Mono-amyl benzene | grams | 100 |
| Sebacic acid | do | 20 |
| PCl₃ | do | 10 |
| Tetrachlorethane-solvent | cc | 150 |
| AlCl₃ | grams | 52 |

A yield of 52 grams of a deep green, moderately viscous oil was obtained as product.

When 2% of the condensation product was added to a waxy-oil the pour point of which was +30° F., a pour point of −5° F. was found.

Example XIX

The following example will illustrate the lubricating oil dyeing property of one of the present condensation products whose method of preparation is described in Example II.

The sample was compared with a commercial red oil dye derived from cracking coil tar.

The following concentrations were required to lower the color of an 11 Robinson color pale oil to 4½ Robinson color:

| | Per cent |
|---|---|
| Amyl-naphthalene polymer | 0.20 |
| Commercial dye | 0.44 |

It will thus be observed that the present condensation product is more than twice as powerful in dyeing potency as the commerical product.

Example XX

A mixture of 138 grams of diphenyl, 120 cc. of normal-amyl chloride and 100 cc. of ethylene dichloride were placed in a 1-liter round-bottom flask, fitted with a CaCl₂ filled drying tube. 15 grams of AlCl₃ were now slowly added to the reaction mixture over 90 minutes, with suitable agitation and maintaining the reaction temperature at 20-25° C. After the addition of the AlCl₃ the reaction mixture was allowed to stand for 12 hours at room temperature with occasional shaking. The CaCl₂ tube was now removed and the reaction vessel placed under a return condenser and the mixture refluxed for 60 minutes. After cooling, the reaction mixture was diluted with 500 cc. of kerosene and neutralized with a mixture of alcohol and water. After settling, the kerosene extract was distilled with fire and steam to 600° F. in order to remove low-boiling products. A bottoms residue comprising 154 grams of a deep green, very viscous oil was obtained as product.

When 2% of this condensation product was added to a waxy-oil, the pour point of which was +30° F., the pour point was found to be −15° F.

The present invention is not to be limited to any theory of the mechanism of the reaction nor to the use of any particular reactants, catalysts and the like, but only to the following claims in which it is desired to claim all novelty inherent in the invention.

I claim:

1. A composition comprising a hydrocarbon lubricating oil normally having a high pour point and a small amount of an oil-soluble pour-depressing condensation product of one mol of a condensible cyclic compound containing at least one short aliphatic chain of at least 3 but less than 10 carbon atoms, with at least one mol of a short chain aliphatic dihalo organic compound having not more than 10 carbon atoms selected from the group consisting of dihalides of short chain aliphatic hydrocarbons and acid halides of short chain aliphatic dibasic organic acids, said condensation product having been formed by condensation of said reactants at a temperature between the approximate limits of 175° F. and 300° F. and said condensation product being substantially free from constituents boiling below about 600° F.

2. Composition according to claim 1 in which the cyclic compound is selected from the group consisting of hydrocarbons, ethers and ketones containing at least one aromatic nucleus.

3. Composition according to claim 1 in which the cyclic compound is an aromatic hydrocarbon.

4. Composition according to claim 1 in which the cyclic compound is a condensed ring aromatic hydrocarbon.

5. Composition according to claim 1 in which the cyclic compound is an alkylated aromatic hydrocarbon containing one saturated aliphatic hydrocarbon group having 3 to 5 carbon atoms.

6. Composition according to claim 1 in which the cyclic compound is monoalkyl naphthalene.

7. Lubricating composition comprising a major proportion of a waxy mineral lubricating oil and a small amount of a pour depressor comprising essentially a condensation product of one mol of a condensible cyclic compound having a short aliphatic chain of at least 3 but less than 10 carbon atoms, and at least two mols of a dichlor aliphatic hydrocarbon of from 1 to 5 carbon atoms, said condensation product being oil-soluble, substantially free from constituents boiling below about 600° F., and obtained by condensation of said reactants at a temperature between the approximate limits of 175° F. and 300° F.

8. Lubricating composition comprising a major proportion of a waxy mineral lubricating oil and a small amount of a pour depressor comprising essentially a condensation product of one mol of a condensible cyclic compound having a short aliphatic chain of at least 3 but less than 10 carbon atoms, and at least one mol of an acid halide of a dibasic organic acid of less than 10 carbon atoms, said condensation product being oil-soluble, substantially free from constituents boiling below about 600° F., and obtained by condensation of said reactants at a temperature between the approximate limits of 175° F. and 300° F.

9. A lubricant comprising a major proportion of a waxy mineral lubricating oil and a small amount of a pour depressor comprising a Friedel-Crafts condensation product of one mol of amyl naphthalene and about 1-2 mols of ethylene dichloride, said condensation product being oil-soluble, substantially free from constituents boiling below about 600° F., and obtained by condensation of said reactants at a temperature between the approximate limits of 175° F. and 300° F.

10. Composition according to claim 9 in which the condensation product is made by condensing substantially equal mols of amyl naphthalene and ethylene dichloride in the presence of aluminum chloride as catalyst, at a temperature of about 175° to 300° F., stopping the reaction while the condensation product is still oil-soluble and recovering from the reaction products a high-boiling distillation residue having pour-depressing properties.

11. A lubricant comprising a major proportion of a waxy mineral lubricating oil and a small amount of a pour-depressing condensation product comprising essentially a plurality of aromatic hydrocarbon groups having alkyl side chains of less than 10 carbon atoms attached thereto, said aromatic hydrocarbon groups being condensed together by aliphatic hydrocarbon groups having not more than 10 carbon atoms, the number of connecting aliphatic groups being at least as great as the number of aromatic groups, said condensation product being oil-soluble and substantially free from constituents boiling below about 600° F.

12. A lubricant comprising a major proportion of a waxy mineral lubricating oil and a small amount of a pour-depressing Friedel-Crafts condensation product of one mol of an aromatic hydrocarbon, at least one mol of an alkyl halide having less than 10 carbon atoms, and at least one mol of an alkylene dihalide having not more than 10 carbon atoms, said condensation product being oil-soluble, substantially free from constituents boiling below about 600° F., and obtained by condensation of said reactants at a temperature between the approximate limits of 175° F. and 300° F.

EUGENE LIEBER.